US010191784B2

United States Patent
Chen et al.

(10) Patent No.: US 10,191,784 B2
(45) Date of Patent: *Jan. 29, 2019

(54) ADAPTIVE QUEUED LOCKING FOR CONTROL OF SPECULATIVE EXECUTION

(71) Applicant: Intel Corporation, Santa Clara, CA (US)

(72) Inventors: Shou C. Chen, Portland, OR (US); Andreas Kleen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/631,913

(22) Filed: Jun. 23, 2017

(65) Prior Publication Data

US 2017/0286187 A1    Oct. 5, 2017

Related U.S. Application Data

(63) Continuation of application No. 14/729,914, filed on Jun. 3, 2015, now Pat. No. 9,715,416.

(51) Int. Cl.
*G06F 9/46*  (2006.01)
*G06F 12/00* (2006.01)
*G06F 13/00* (2006.01)
*G06F 13/28* (2006.01)
*G06F 9/52*  (2006.01)
(Continued)

(52) U.S. Cl.
CPC .............. *G06F 9/528* (2013.01); *G06F 9/467* (2013.01); *G06F 9/48* (2013.01); *G06F 9/4881* (2013.01); *G06F 9/50* (2013.01); *G06F 9/5005* (2013.01); *G06F 9/5011* (2013.01); *G06F 9/5016* (2013.01); *G06F 9/5022* (2013.01); *G06F 9/52* (2013.01); *G06F 9/526* (2013.01)

(58) Field of Classification Search
CPC . G06F 9/48; G06F 9/4881; G06F 9/50; G06F 9/5005; G06F 9/5011; G06F 9/5016; G06F 9/5022; G06F 9/52; G06F 9/526; G06F 9/528

See application file for complete search history.

(56) References Cited

U.S. PATENT DOCUMENTS 6,247,025 B1   6/2001   Bacon
7,600,078 B1   10/2009  Cen et al.
(Continued)

OTHER PUBLICATIONS

Mellor-Crummey et al., "Algorithms for Scalable Synchronization on Shared-Memory Multiprocessors," Jan. 1991, 42 pages.
International Searching Authority, "Search Report," issued by the in connection with PCT application No. PCT/US2016/030167, dated Aug. 19, 2016, 5 pages.
(Continued)

*Primary Examiner* — Charles M Swift
(74) *Attorney, Agent, or Firm* — Hanley, Flight & Zimmerman, LLC (57) ABSTRACT

Adaptive queued locking for control of speculative execution is disclosed. An example apparatus includes a queue controller to control removal of threads from a queue that contains threads waiting to be permitted to speculatively execute in a critical section of a multi-threaded program. The apparatus also includes a first thread associated with a head node of the queue. The queue controller controls the removal of threads from the queue in response to operations performed by the first thread. In addition, an adjuster to change a number of threads permitted to speculatively execute based on a rate of threads currently speculatively executing transactions in the critical section is included.

16 Claims, 7 Drawing Sheets

(51) Int. Cl.
*G06F 9/50* (2006.01)
*G06F 9/48* (2006.01)

(56) References Cited

U.S. PATENT DOCUMENTS

| | | |
|---|---|---|
| 8,789,057 B2 | 7/2014 | Dice et al. |
| 2003/0014473 A1 | 1/2003 | Ohsawa et al. |
| 2005/0144602 A1 | 6/2005 | Ngai et al. |
| 2006/0053351 A1 | 3/2006 | Anderson et al. |
| 2007/0011684 A1 | 1/2007 | Du et al. |
| 2010/0138836 A1 | 6/2010 | Dice et al. |
| 2010/0169623 A1 | 7/2010 | Dice |
| 2011/0055484 A1 | 3/2011 | Eichenberger et al. |
| 2011/0209155 A1 | 8/2011 | Giampapa et al. |
| 2011/0314230 A1 | 12/2011 | Zhang et al. |
| 2012/0227045 A1 | 9/2012 | Knauth et al. |
| 2013/0081060 A1 | 3/2013 | Otenko |
| 2014/0207987 A1 | 7/2014 | Ahn et al. |
| 2014/0297970 A1 | 10/2014 | Rajwar et al. |
| 2015/0026688 A1 | 1/2015 | Dice et al. |
| 2016/0246641 A1 | 8/2016 | Kogan et al. |

OTHER PUBLICATIONS

International Searching Authority, "Written Opinion," issued by the in connection with PCT application No. PCT/US2016/030167, dated Aug. 19, 2016, 8 pages.

Leung et al., "Restricted admission control in view-oriented transactional memory", Jan. 19, 2012 (19 pages).

Atoofian et al., "Speculative Contention Avoidance in Software Transactional Memory", IEEE International Parallel & Distributed Processing Symposium, 2011 (7 pages).

Yoo et al., "Adaptive Transaction Scheduling for Transactional Memory Systems", Jun. 2008 (10 pages).

United States Patent and Trademark Office, "Non-Final Office Action", issued in connection with U.S. Appl. No. 14/729,914, dated May 27, 2016 (11 pages).

United States Patent and Trademark Office, "Final Office Action", issued in connection with U.S. Appl. No. 14/729,914, dated Oct. 25, 2016 (13 pages).

United States Patent and Trademark Office, "Notice of Allowance", issued in connection with U.S. Appl. No. 14/729,914, dated Mar. 14, 2017 (8 pages).

International Bureau, "International Preliminary Report on Patentability", issued in connection with International Patent Application No. PCT/US2016/030167, dated Dec. 5, 2017 (8 pages).

ADAPTIVE QUEUED LOCKING FOR CONTROL OF SPECULATIVE EXECUTION

RELATED APPLICATIONS

This patent arises from a continuation of U.S. patent application Ser. No. 14/729,914, entitled "Adaptive Queued Locking for Control of Speculative Execution," filed on Jun. 3, 2015 (now U.S. Pat. No. 9,715,416). Priority to U.S. patent application Ser. No. 14/729,914 is hereby claimed. U.S. patent application Ser. No. 14/729,914 is hereby incorporated herein by reference in its entirety.

FIELD OF THE DISCLOSURE

This disclosure relates generally to computing platforms and, more particularly, to adaptive queued locking for control of speculative execution in transactional memory.

BACKGROUND

In transactional memory systems, regions of code are speculatively executed in parallel. Conflicts arise when, for example, two transactions attempt to access a same location in memory. For example, a conflict occurs when first and second transactions attempt to write to a same location in memory. Additionally, a conflict occurs when a first transaction attempts to write to a location in memory and a second transaction attempts to read that same location in memory.

DETAILED DESCRIPTION

Systems that utilize parallel execution of code encounter challenges arising from different code concurrently accessing a same portion of memory. Techniques are available to mitigate or reduce adverse performance effects of such conflicts. However, these techniques involve their own challenges. For example, some transactional memory features may experience conflict overloads. Transactional Synchronization Extensions (TSX), which is an implementation of transactional memory, involves multiple threads speculatively executing in parallel. Each thread includes one or more transactions (e.g., memory transactions). When a conflict occurs in connection with a particular thread, the corresponding transactions are aborted and subsequently retried. In some instances, the transactions are retried several times before being able to successfully execute. In some instances, the transactions fall back to a non-transactional path.

When a high number of conflicts are experienced, the correspondingly high number of transactional aborts prevents forward progress through the code. Such problems arise when, for example, a probability of conflict for a particular section of code increases rapidly as more threads are running. When a conflict occurs and the threads retry execution after being aborted, the probability of conflict escalates quickly as new threads arrive and introduce more conflicts, forming a positive feedback on the probability of conflict. Eventually, a bottleneck forms and the threads attempting to retry execution after being aborted cannot make significant forward progress (e.g., only undesirably slow progress is made) because too many threads are attempting to execute concurrently.

Some transactional memory systems mitigate the bottleneck by implementing locks that tightly control access to critical sections, which are sections of code that access shared memory and, thus, have potential to create conflicts when executed by multiple threads in parallel. Specifically, locks protect the critical section of code by prohibiting all but one thread from executing the critical section of code. Only the thread that has acquired the lock is allowed to execute the critical section. In such instances, the threads compete for the lock by, for example, repeatedly attempting to acquire the lock, thereby granting a thread that obtains the lock permission to execute in the critical section.

One example lock is the MCS lock, which is named according to the initials of its authors, Michael L. Scott and John M. Mellor-Crummey. In known systems, the MCS lock is utilized when a corresponding system enters an exclusive mode in which only one thread is allowed to execute in a critical section, as opposed to a transaction mode in which the threads are allowed to speculatively execute in the critical section in parallel. The system of such a known system may enter the exclusive mode in response to a threshold number of abortions having occurred within a threshold amount of time. To enforce the exclusive mode, the known MCS lock organizes the threads that have been aborted (e.g., in response to a conflict in the critical section) into a queue. Each node of the MCS queue corresponds to a previously aborted thread waiting for permission to execute in the critical section. In particular, the threads of the MCS queue spin on respective local variables while waiting in the queue. Notably, the MCS lock allows only the thread located at a head of the MCS queue to execute to retry the aborted transactions. As such, the MCS lock limits execution of retries in the critical section to a single thread. While this approach alleviates the bottleneck effect described above, the single-thread limitation of this approach may curb throughput of the corresponding system.

Example methods and apparatus disclosed herein improve handling of conflicts in, for example, transactional memory systems. While examples below are described in connection with transactional memory systems, example methods and apparatus disclosed herein can be utilized in any suitable type of system. Examples disclosed herein provide an adaptive queued locking technique that enables a dynamic number of threads to speculatively execute in a critical section, including threads for which a conflict has occurred. In contrast to known systems, in which either all threads are allowed to speculatively execute in the critical section or only one thread is allowed to execute in the critical section, examples disclosed herein provide fine-grained control over how many threads can concurrently execute in the critical section. Examples disclosed herein control the number of allowed threads by maintaining a dynamic quota and tracking a count of threads currently executing in the critical section. When the count of threads meets the quota, examples disclosed herein deny additional threads from executing in the critical section. Accordingly, examples disclosed herein throttle the number of threads concurrently speculatively executing in the critical section.

Moreover, examples disclosed herein adapt the quota of executing threads according to a success rate of thread execution (e.g., execution retries within a threshold number of retries and/or within a threshold amount of time). The success rate corresponds to, for example, a percentage of threads or transactions that successfully execute (e.g., are executed in full and committed) without experiencing a conflict. For example, if the success rate of recent retried executions is above a threshold percentage, examples disclosed herein increase the quota that controls how many threads are allowed to concurrently retry execution in the critical section. In some examples, if the success rate of the recent retried executions is below a same or different threshold percentage, examples disclosed herein decrease or reset the quota. Accordingly, examples disclosed herein repeatedly or continuously adjust the number of threads executing in the critical section such that throughput is improved while reducing a probability of conflict.

Figure 1:
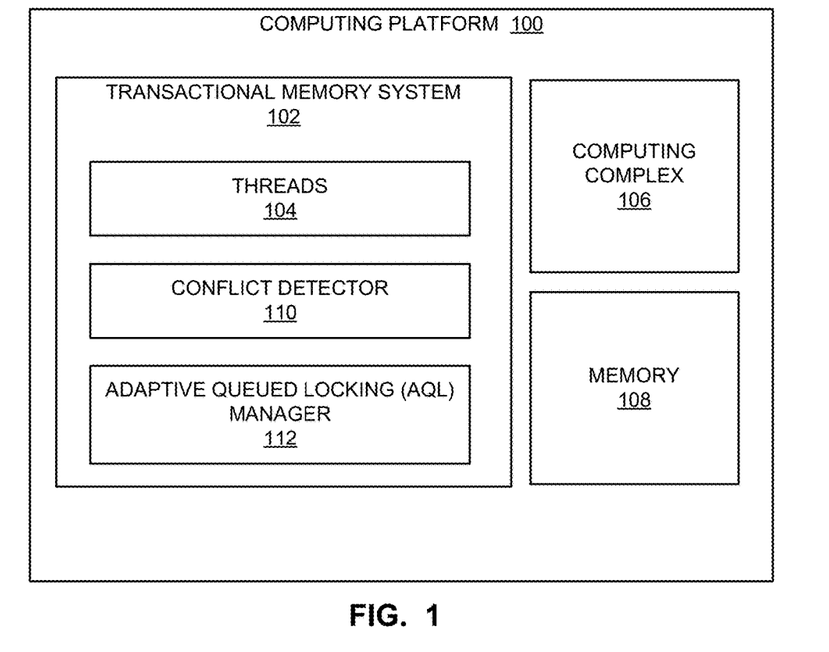
FIG. 1 is an illustration of an example computing platform constructed in accordance with teachings of this disclosure.

FIG. 1 illustrates an example computing platform 100 including a transactional memory system 102. The example transactional memory system 102 of FIG. 1 enables parallel execution of threads 104 by, for example, a computing complex 106. The example computing complex 106 of FIG. 1 includes one or more processors to execute code of the threads 104. In the illustrated example, one or more of the threads 104 include transactions (e.g., memory transactions) to be speculatively executed via the transactional memory system 102. Some code of the threads 104 are critical sections that involve access to shared portions of memory 108.

As described above, conflicts may arise when, for example, different speculative transactions of one or more of the threads 104 attempt to access (e.g., write to) a same portion of the memory 108. Additional or alternative types of conflicts may arise. The example transactional memory system 102 of FIG. 1 includes a conflict detector 110 to respond to conflicts by causing the transactions being speculatively executed at a time of the conflict to abort. Aborted transactions are retried at a later time.

The example transactional memory system 102 of FIG. 1 includes an adaptive queued locking (AQL) manager 112 constructed in accordance with teachings of this disclosure. The example AQL manager 112 of FIG. 1 dynamically controls how many of the threads 104 are allowed to speculatively execute in a critical section of the corresponding code. Moreover, the example AQL manager 112 of FIG. 1 dynamically adjusts a quota that controls the number of the threads 102 that are allowed to execute in the critical section based on, for example, a success rate of the threads 104 and/or transactions of the threads 104.

As described in detail below, the example AQL manager 112 of FIG. 1 provides a lock and a queue, which cooperate to organize and facilitate execution of those of the threads 104 which were previously aborted due to, for example, a conflict. Those of the threads 104 experiencing a conflict add themselves to the queue provided by the example AQL manager 112 of FIG. 1. The lock of the example AQL manager 112 of FIG. 1 enables dynamic control of an ability of the queued threads 104 to execute in the critical section. That is, the example AQL manager 112 of FIG. 1 enables throttling of concurrent speculative execution of transactions in the critical section. In the illustrated example of FIG. 1, one of the threads 104 at a head of the queue provided by the AQL manager 112 performs one or more of the functions or operations that control or throttle the number of the threads 104 that are allowed to speculatively execute in the critical section.

As such, the example AQL manager 112 of FIG. 1 provides fine-grained control over the number of threads allowed in the critical section at a given time. Notably, the fine-grained control provided by the example AQL manager 112 is an improvement over known locking techniques that allow all threads to speculatively execute and then have to resort to exclusive execution for only one thread at a time when faced with an overload of aborts. By allowing a fine-grained number of transactions to be speculatively executed (e.g., as retries after being aborted), the example AQL manager 112 of FIG. 1 enables the example transactional memory system 102 (or any other suitable type of system implementing the example AQL manager 112) to more quickly process the transactions of the threads 104 and to avoid constant aborts when too many threads speculate.

Moreover, by dynamically adjusting the number of threads allowed to speculatively execute in the critical section at a given time (e.g., based on a success rate associated with the speculative execution of the transactions in the critical section), the example AQL manager 112 of FIG. 1 adapts the throttling of the speculative execution of transactions according to the rate at which transactions are being successfully executed and committed. The adaptive throttling provided by the example AQL manager 112 of FIG. 1 attempts to achieve an optimal average number of threads running in the critical section, thereby taking full advantage of the parallelism provided by the hardware of the transactional memory system 102.

Figure 2:
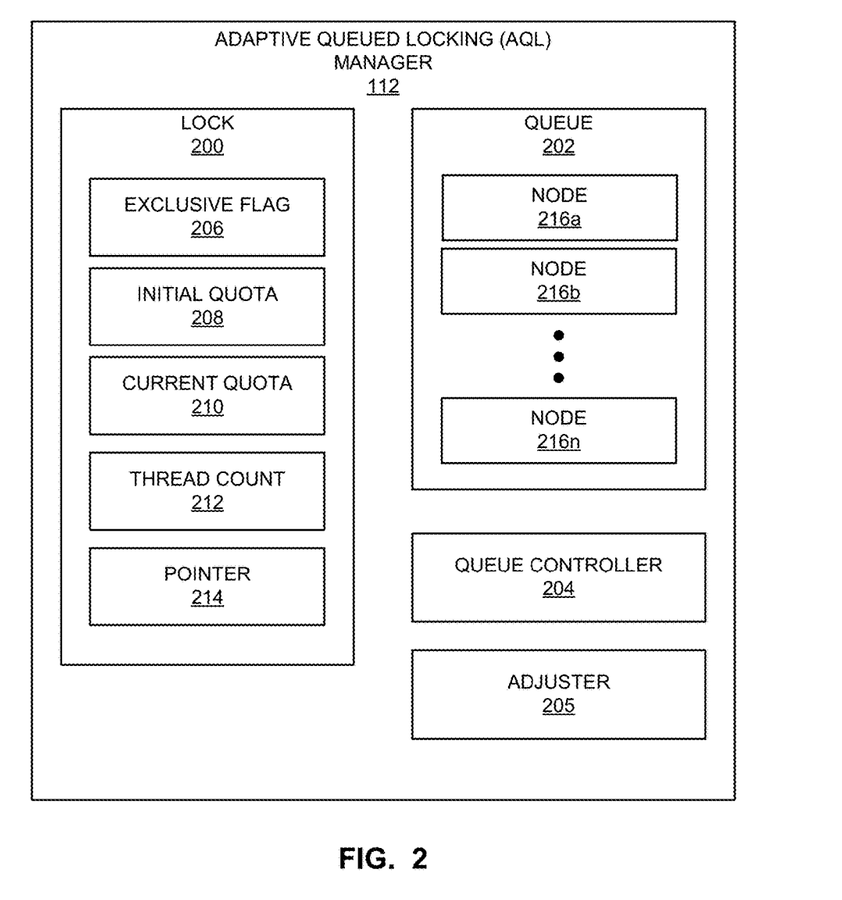
FIG. 2 is a block diagram of an example implementation of the example adaptive queued locking (AQL) manager of FIG. 1.

FIG. 2 illustrates an example implementation of the AQL manager 112 of FIG. 1. The example AQL manager 112 of FIG. 2 includes a lock 200, a queue 202, a queue controller 204, and an adjuster 205. The example lock 200 of FIG. 2 maintains an exclusive flag 206, an initial quota 208, a current quota 210, a thread count 212 and a pointer 214. As described in detail below, the example lock 200 cooperates with the queue 202 to throttle execution of the threads 104 in, for example, a critical section of code.

The example exclusive flag 206 of FIG. 2 is a binary field that indicates whether speculative execution of the critical section by the threads 104 of FIG. 1 is currently allowed. In the illustrated example of FIG. 2, the exclusive flag 206 is set to true when speculative execution in the critical section is not allowed. In the illustrated example of FIG. 2, the exclusive flag 206 is set to false when speculative execution in the critical section is allowed. When speculative execution in the critical section is not allowed by the example lock 200 of FIG. 2, any of the threads 104 attempting to speculatively execute in the critical section are placed in the queue 202 and only the thread at the head of the queue 202 is allowed to execute in the critical section.

When a thread attempts to enter a critical section protected by the lock 200, the example exclusive flag 206 is set to false (e.g., by the thread at the head of the queue) to enable, for example, speculative execution of the threads 104 and/or throttled execution of those of the threads 104 that were already placed in the queue 202 after having been aborted.

In the illustrated example of FIG. 2, the queue 202 includes one or more nodes 216, each of which corresponds to one of the threads 104 that has been placed in the queue 202. That is, each of the threads 104 currently in the queue 202 is represented by one of the nodes 216. The example queue 202 of FIG. 2 is implemented by a linked list that includes the nodes 216. However, any suitable data structure may be used to implement the queue 202 and/or the nodes 216. In the example of FIG. 2, a head item of the queue 202 is labeled as node 216a, while a last item of the queue 202 is labeled as node 216n. When the queue 202 includes only one node, the same one of the nodes 216 is the head node 216a and the last node 216n.

In the illustrated example of FIG. 2, the queue controller 204 controls removal (e.g., dequeue) of threads from the queue 202. In the illustrated example of FIG. 2, one or more functions or operations of the queue controller 204 associated with removal of the threads from the queue 202 are implemented by the thread at the head of the queue 202, which corresponds to the head node 216a. Additionally, in the illustrated example of FIG. 2, the threads add themselves to the queue 202. Alternatively, the queue controller 204 can handle both additions to and removals from the queue 202. When one of the threads 104 adds itself to the queue 202, that thread creates a new node and swaps (e.g., via an atomic swap) the new node with the last node 216n already present in the queue 202. That is, the newly created node is designated as the last node 216n and the node previously at the end of the queue 202 is designated as the second-to-last item in the queue 202. In the example of FIG. 2, the pointer 214 of the lock 200 points to the last node 216n of the queue 202. Thus, when the newly created node is added to the queue 202, the swap involves changing the pointer 214 of the lock 200 from pointing to the previously last one of the nodes 216 to pointing to the newly created one of the nodes 216n. Additionally, the swap involves causing the previously last one of the nodes 216 to point to the new one of the nodes 216n.

In the example of FIG. 2, aborted ones of the threads 104 are added to the queue 202 of FIG. 2 in response to the corresponding transactional abort performed by the conflict detector 110 of FIG. 1. Additionally, any of the threads 104 attempting to speculatively execute in the critical section when the exclusive flag 206 is set to true are added to the queue 202. When the exclusive flag 206 is set to false and the threads 104 present in the queue 202 are allowed to retry execution in the critical section, the lock 200 allows a particular number of those threads 104 to retry execution in the critical section. In particular, the example lock 200 of FIG. 2 enforces a quota to control the particular number of threads 104 allowed to execute in the critical section. In the example of FIG. 2, the quota is enforced via the initial quota 208 and the current quota 210. The example initial quota 208 of FIG. 2 represents an initial number of the threads 104 that the lock 200 allows to execute in the critical section after being present in the queue 202. The initial value of the initial quota 208 is set according to, for example, a default setting and/or user (e.g., administrator) input. In the illustrated example of FIG. 2, the initial quota 208 is adjusted according to a success or failure of the retried executions from the queue 202. Alternatively, the initial quota 208 may be static and serves only as a starting point for the number of threads 104 allowed in the critical section. The dynamic adjustment of the initial quota 208 via the example adjuster 205 of FIG. 2 is described in detail below.

The example current quota 210 represents a current number of threads 104 that the lock 200 allows to execute in the critical section after being present in the queue 202. In the illustrated example, the current quota 210 is initially set equal to the initial quota 208 and is adjusted over time according to a success or failure of the retried executions from the queue 202. In the illustrated example of FIG. 2, the initial quota 208 and the current quota 210 are dynamically adjusted, as described in detail below. However, when the initial quota 208 is static, the example current quota 210 is solely dynamically adjusted.

The example thread count 212 represents a current number of threads 104 from the queue 202 that are executing in the critical section at a given time. For example, when one of the threads 104 present in the queue 202 enters the critical section to retry execution after being aborted, the example adjuster 205 increases (e.g., increments) the thread count 212. Additionally, when the thread of the head node 216a successfully executes to completion and is committed, the example adjuster 205 resets (e.g., adjusts to zero (0)) the thread count 212. Thus, the example thread count 212 represents the number of threads 104 currently executing in the critical section after being in the queue 202. As described below, the example lock 200 of FIG. 2 compares the thread count 212 to the current quota 210 to determine whether more of the threads 104 present in the queue 202 are to be allowed to execute in the critical section.

As an example of the dynamic adjustments made to the quota enforced by the example lock 200 of FIG. 2, the initial quota 208 is set to a first value at a time when the nodes 216 of the queue 202 become available to execute in the critical section. When the lock 200 enables the queued threads 104 to enter the critical section, the thread count 212 is likely zero. In the illustrated example, the thread of the head node 216a is granted control over whether the head node 216a can enter the critical section to retry execution of the transactions of the corresponding one of the threads 104. As such, the thread of the head node 216a determines whether the thread count 212 is less than the current quota 210, which is initially set to a same value as the initial quota 208. If the thread count 212 is less than the current quota 210 and the head node 216a is not also the last node 216n of the queue 202, the thread of the head node 216a is dequeued and the corresponding one of the threads 104 retries execution in the critical section and the thread count 212 is increased (e.g., incremented) by, for example, the adjuster 205. Further, with the head node 216a being dequeued, the previously second node 216b becomes the head node 216a.

If the thread count 212 is less than the current quota 210 and the head node 216a is also the last node 216n of the queue 202, the head node 216a remains in the queue 202 and the corresponding one of the threads 104 proceeds to speculative execution.

If the thread count 212 has reached the current quota 210, the head node 216a remains at the head of the queue 202 and the corresponding one of the threads 104 retries execution in the critical section and the adjuster 205 increases (e.g., increments) the thread count 212. In the illustrated example of FIG. 2, the head node 216a remains at the head of the queue 202 in such instances as a cork to stop further progress of the nodes 216 of the queue 202 into the critical section because the current quota 210 has been reached. That is, when the thread count 212 has reached the current quota 210, the head node 216a does not dequeue itself while retrying execution in the critical section. As such, when the current quota 212 has been reached, a particular number of the threads 104 have been dequeued and are retrying execution in the critical section, along with the thread at the head of the queue 202. The number of dequeued threads executing the critical section, plus the thread at the head of the queue 200 executing in the critical section corresponds to the number of threads allowed to retry execution in the critical section.

The threads 104 that retry execution after being in the queue 202 are successful or another conflict is experienced. In the example of FIG. 2, the success or failure of the head node 216a thread determines whether the initial quota 208 and/or the current quota 210 are adjusted. In the example of FIG. 2, if any thread in the critical section experiences a conflict then all threads in the critical section, including the head node 216a thread, are aborted by the conflict detector 110. Threads in the critical section that are not on the queue 202 requeue themselves. If the thread 104 seeing the conflict corresponds to the head node 216a at the time of the conflict, the queue controller 204 may requeue the thread at the head node 216a to the end of the queue (e.g., for fairness). Alternatively, the queue controller 204 may dequeue the thread at the head node 216a for an immediate retry speculative execution. Further, if the thread 104 seeing the conflict corresponds to the head node 216a at the time of the conflict, the adjuster 205 decreases (e.g., decrements) the current quota 210 and sets the thread count 212 to zero (0). Decreasing the current quota 210 reduces the number of threads 104 allowed to retry execution in the critical section in a subsequent iteration and, thus, increases a likelihood of success (e.g., complete execution without conflict). Accordingly, conflicts experienced by the threads 104 being retried after being in the queue 202 results in a lower current quota 210. Accordingly, the difference between the current quota 210 and the initial quota 208 serves as a count of retry attempts before the head 216a of the queue 200 has a successful execution.

In the illustrated example, when a conflict has occurred or successful execution has occurred (e.g., as indicated by the thread count 212 being set back to zero (0)), the lock 200 determines a relationship between the current value of the initial quota 208 and the current value of the current quota 210. If the initial quota 208 is the same as the current quota 210, thereby indicating that a conflict did not occur because the current quota 210 was not decreased, the adjuster 205 increases (e.g., increments) the initial quota 208. That is, because a conflict did not occur with the initial quota 208 set at a first value, the AQL manager 112 increases an aggressiveness for the number of the threads 104 allowed to execute (e.g., speculatively) in the critical section. At an onset of a next iteration of retries, the current quota 210 is set equal to the initial quota 208 and, thus, the number of the threads 104 allowed to retry execution from the queue 202 is greater than the previous execution.

Conversely, when the lock 200 determines a relationship between the current value of the initial quota 208 and the current value of the current 210, the current quota 210 may be less than the initial quota 208, thereby indicating that a conflict did occur. In the example of FIG. 2, if the current quota 210 is less than the initial quota 208 by more than a threshold amount (e.g., one (1)), the adjuster 205 decreases (e.g., decrements) the initial quota 208. Because the current quota 210 is set to equal the initial quota 208 at the onset of each iteration, a reduction in the initial quota 208 results in a reduction in the current quota 210 and, thus, the number of the threads 104 allowed to execute in the critical section is reduced.

Accordingly, the example lock 200 of FIG. 2 and the corresponding variables enable fine-grained control over the number of the threads 104 allowed to retry execution in the critical section and dynamic adjustment of that number. In some examples, when the number of retry attempts exceeds a threshold or if the initial quota 208 reaches a particular value (e.g., two (2)), the lock 200 sets the exclusive flag 206 to true to let the thread 104 at the head node 216a have exclusive ownership of the critical section. In such instances, with exclusive control over the critical section, the thread 104 is no longer executed speculatively and should have success. In some examples, speculative execution in the critical section resumes subsequent to the successful execution of the threads 104 at the head node 216a via the exclusive access to the critical section.

While the above description of FIG. 2 includes adjustments to the initial quota 208, the current quota 210 and the thread count 212 being performed by the example adjuster 205, in some examples the thread at the head of the queue 202 performs the adjustments to the initial quota 208, the current quota 210 and/or the thread count 212. For example, the thread at the head of the queue 202 may provide instructions to the adjuster 205 to make the appropriate changes and/or the thread at the head of the queue 202 may directly make the adjustments to one or more of the variables associated with the lock 200.

While an example manner of implementing the AQL manager 112 of FIG. 1 is illustrated in FIG. 2, one or more of the elements, processes and/or devices illustrated in FIG. 2 may be combined, divided, re-arranged, omitted, eliminated and/or implemented in any other way. Further, the example lock 200, the example queue 202, the example queue controller 204, the example adjuster 205 and/or, more generally, the example AQL manager 112 of FIG. 2 may be implemented by hardware, software, firmware and/or any combination of hardware, software and/or firmware. Thus, for example, any of the example lock 200, the example queue 202, the example queue controller 204, the example adjuster 205 and/or, more generally, the example AQL manager 112 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example lock 200, the example queue 202, the example queue controller 204, the example adjuster 205 and/or, more generally, the example AQL manager 112 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example AQL manager 112 of FIG. 1 may include one or more elements, processes and/or devices in addition to, or instead of, those illustrated in FIG. 2, and/or may include more than one of any or all of the illustrated elements, processes and devices.

Figure 3:
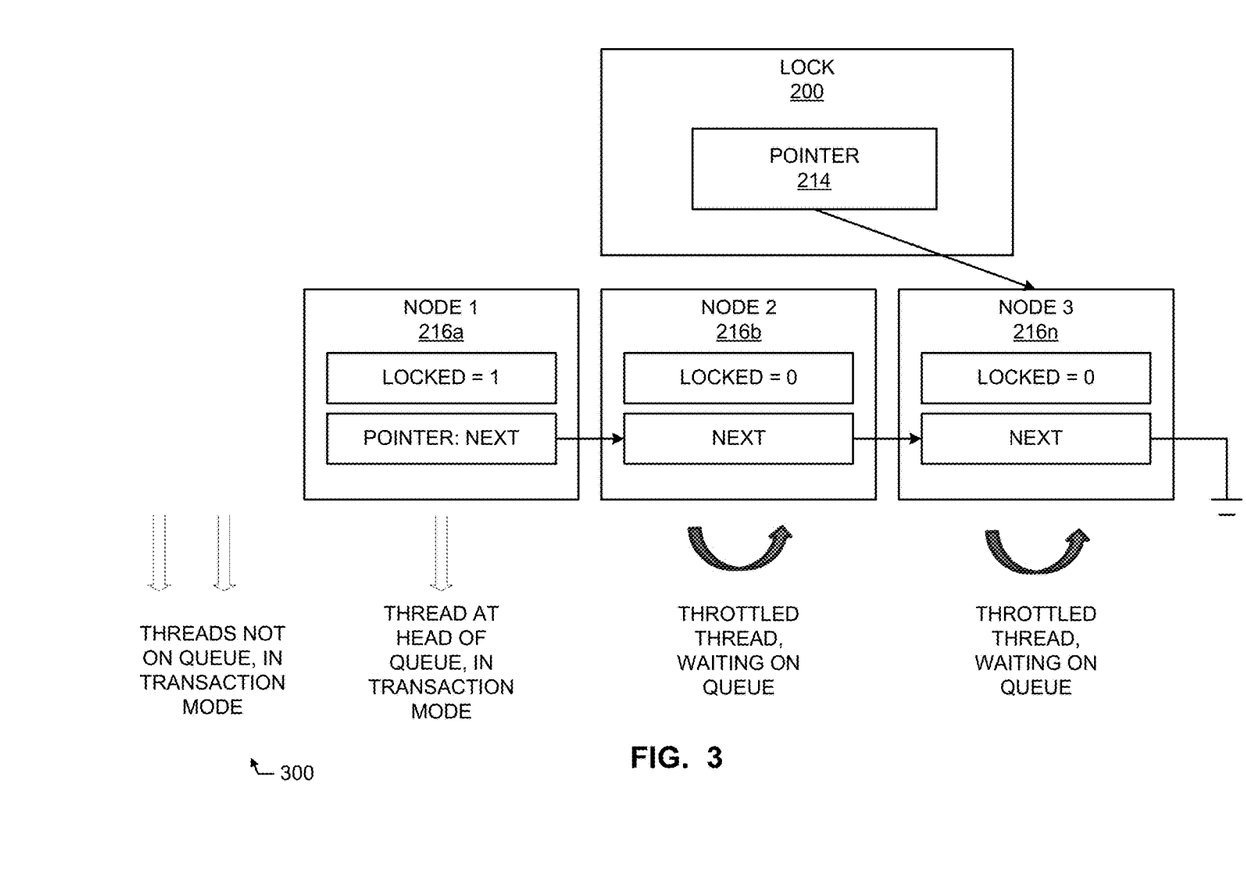
FIG. 3 is a diagram illustrating an example state of the AQL manager of FIGS. 1 and/or 2.

FIG. 3 illustrates an example state of the example lock 200 and the example queue 202 of the example AQL manager 112 of FIG. 2. The example of FIG. 3 corresponds to the exclusive flag 206 of the lock 200 being set to false, thereby enabling threads 104 present in the queue 202 to retry execution in the critical section, in accordance with the current quota 210. The example of FIG. 3 includes a first set 300 of the threads 104 that are executing in the critical section. The example first set 300 of the threads 104 of FIG. 3 includes dequeued one(s) of the threads 104. For example, at a time before the state illustrated in FIG. 3, the head node 216a of the queue may have been dequeued to join the first set 300 of the threads 104. In some examples, the first set 300 additionally includes one or more newly arriving threads (e.g., threads that have not completed successfully and have not been aborted).

In the example of FIG. 3, the head node 216a of the queue is retrying execution in the critical section but remains in the queue 202. Accordingly, the example of FIG. 3 corresponds to the thread count 212 having reached the current quota 212. The head node 216a is indicated by a local variable named "locked" of the head node 216a being set to true (e.g., in response to that node becoming the head node 216a). The remaining nodes 216b, 216n of the queue 202 are waiting (e.g., spinning on the respective local variables that are currently set to false) to reach the head of the queue 202, at which time those nodes 216b, 216n may retry execution in the critical section. As described above, the head node 216a remaining in the queue 202 when the current quota 212 has been reached prevents the other nodes of the queue 202 from becoming the head node 216a and, thus, being able to retry execution in the critical section. However, if the head node 216a is dequeued (e.g., joins the first set 300 of the threads 104), the second node 216b becomes the head node 216a and it is determined whether the thread count 210 has reached the current quota 212.

Figure 4:
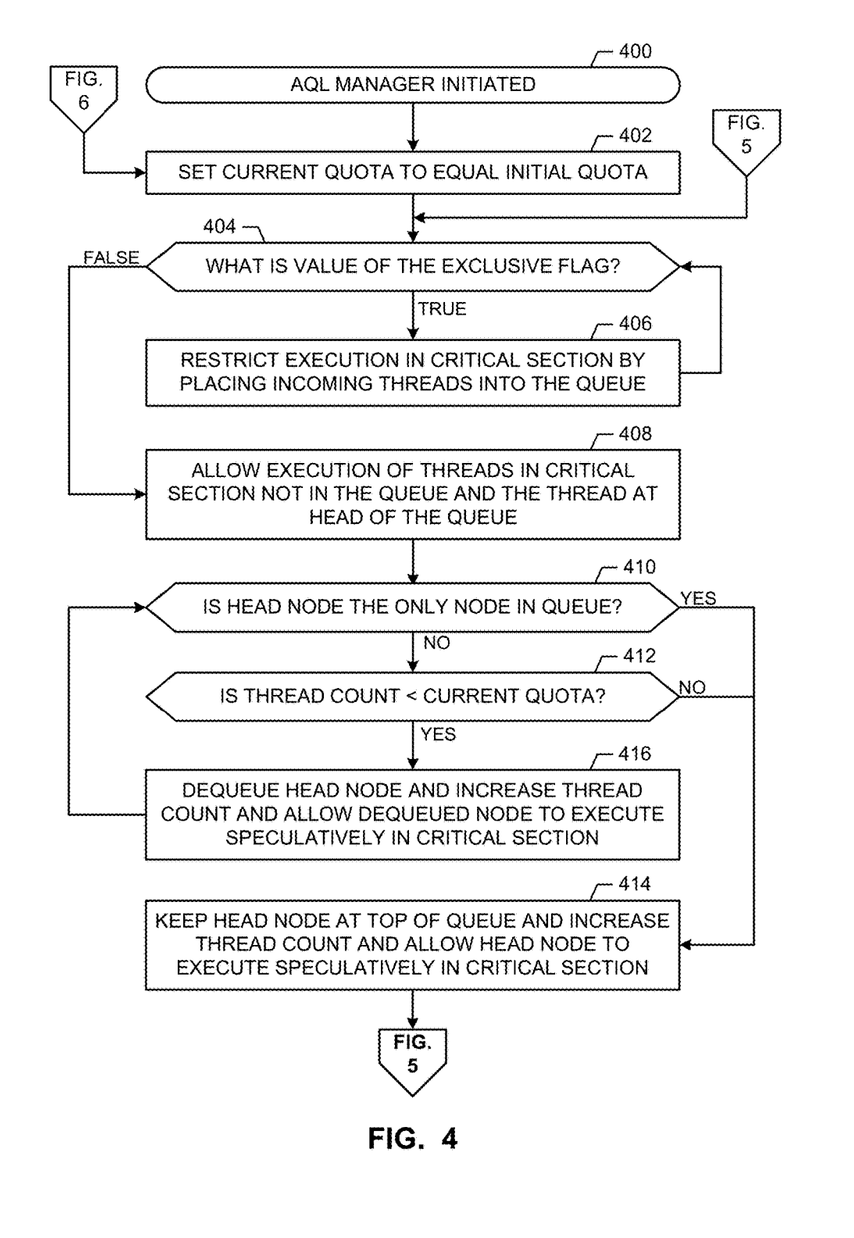
FIGS. 4-6 are a flowchart representative of example machine readable instructions that may be executed to implement the example AQL manager of FIGS. 1 and/or 2.
Figure 5:
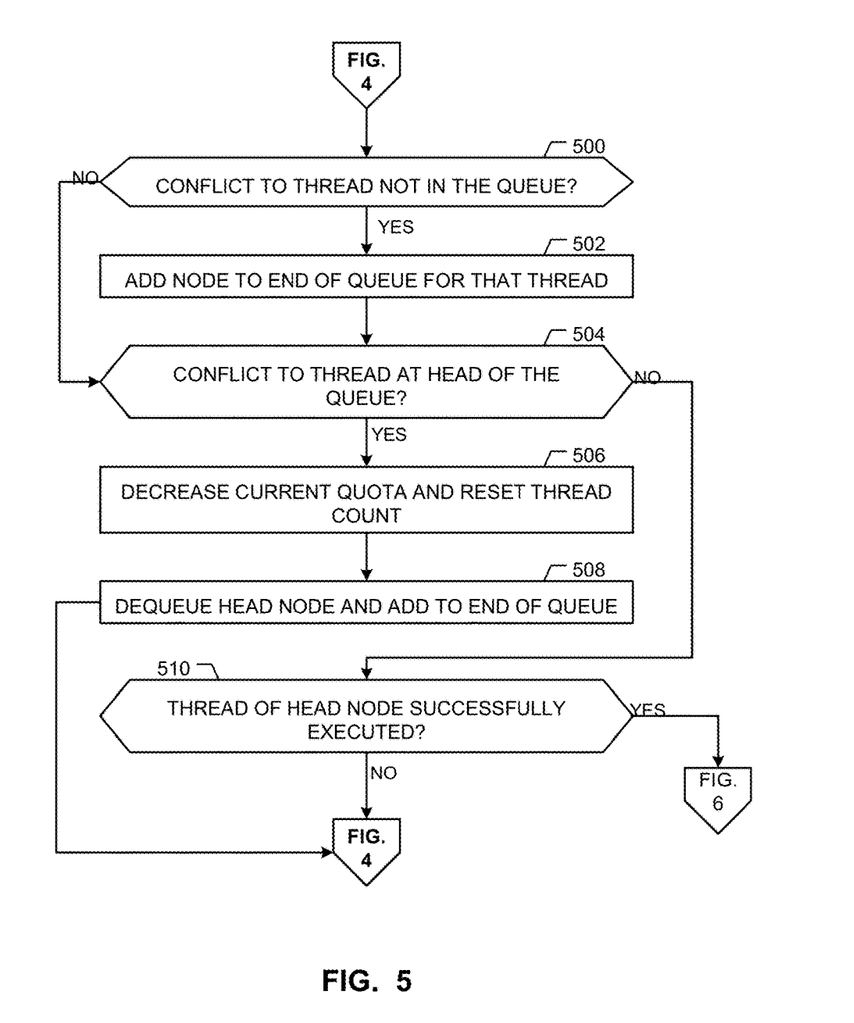
Figure 6:
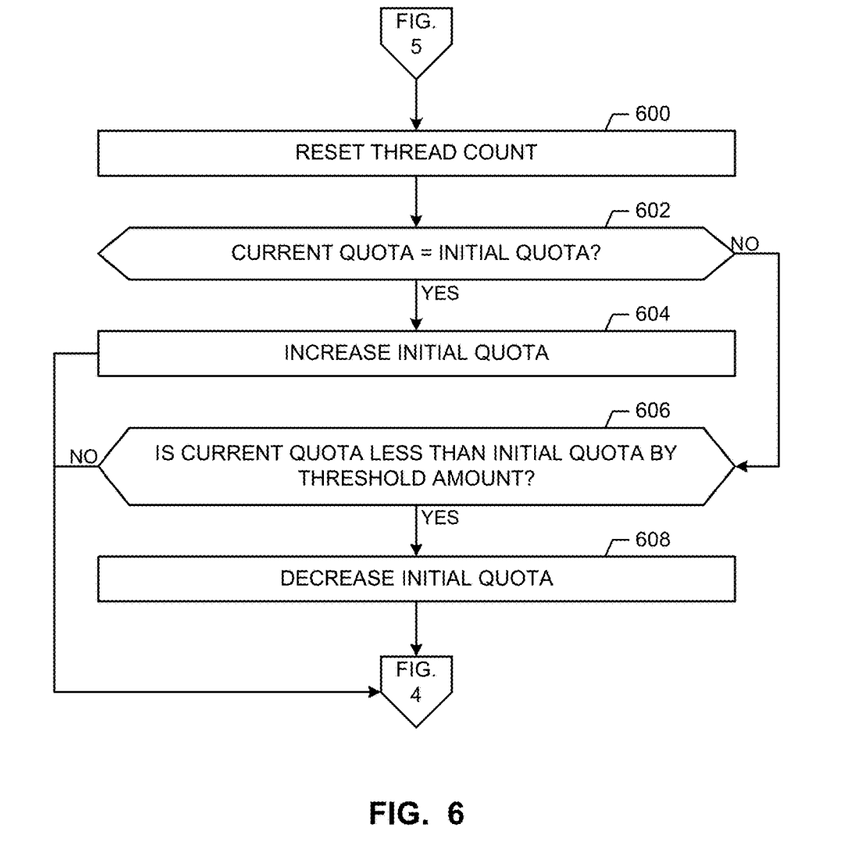

FIGS. 4-6 are a flowchart representative of example machine readable instructions for implementing the example AQL manager 112 of FIGS. 1 and/or 2. In the examples of FIGS. 4-6, the machine readable instructions comprise one or more programs for execution by a processor such as the processor 712 shown in the example processor platform 700 discussed below in connection with FIG. 7. The programs may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 1012 and/or embodied in firmware or dedicated hardware. Further, although the example programs are described with reference to the flowcharts illustrated in FIGS. 4-6, many other methods of implementing the example AQL manager 112 of FIGS. 1 and/or 2 may alternatively be used. For example, the order of execution of the blocks may be changed, and/or some of the blocks described may be changed, eliminated, or combined.

As mentioned above, the example processes of FIGS. 4-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example flowchart of FIGS. 4-6 begins with an initiation of the example AQL manager 112 of FIGS. 1 and/or 2 (block 400). In the illustrated example, the initiation of the AQL manager 112 includes setting (e.g., via the lock 200) values for the exclusive flag 206 (e.g., to false), the initial quota 208 (e.g., to a default value or a value based on user input), the thread count 212 (e.g., to zero (0)) and the pointer 214 (e.g., to null). In the illustrated example, the lock 200 sets the current quota 210 to equal the initial quota 208 (block 402). As described above, the current quota 210 determines how many threads are allowed to concurrently execute in the critical section.

In the illustrated example, the lock 200 checks the value of the exclusive flag 206 (block 404). In the example of FIG. 4, if the exclusive flag 206 is set to true (block 404), the lock 200 restricts or prohibits threads not at the head of the queue 202 from executing in the critical section (block 406). In the illustrated example, the threads attempting to enter the critical section place themselves into the queue 202 (block 406). In the illustrated example, the threads are placed into the queue 202 as the nodes 216 in an order in which the threads are received. As such, the head node 216a of the queue 202 is the oldest member of the queue 202. In the illustrated example, the lock 200 continues to restrict access to the critical section and the threads continue to be added to the queue 202 until the exclusive flag 206 is set to false (block 404). In the illustrated example, when the exclusive flag 206 is set to false (block 404), the lock 200 allows execution of those of the threads 104 that are not in the queue 202 and execution of the thread represented by the head node 216a of the queue 202 (block 408).

In the illustrated example, the thread of the head node 216a determines whether the head node 216a is the only node in the queue 202 (block 410). If the head node 216a is not the only node in the queue 202, control proceeds to block 412. If the head node 216a is the only node in the queue 202, the queue controller 204 maintains the head node 216a at the head of the queue and the adjuster 205 increases (e.g., increments) the thread count 212 (block 414). Further, the thread corresponding to the head node 216a is allowed to speculatively execute in the critical section (block 414). Thus, when the thread corresponding to the node newly found at the head of the queue 202 is maintained at the head of the queue 202 at block 414, that thread retries execution in the critical section. Control proceeds to FIG. 5.

When the head node is not the only node in the queue 202 at block 410, the thread of the head node 216a determines whether the thread count 212 is less than the current quota 210 (block 412). In the illustrated example, if the thread count 212 is less than the current quota 210 (block 410), the thread corresponding to the head node 216a dequeues itself and the adjuster 205 increases (e.g., increments) the thread count 212 (block 416). Further, as described above in connection with block 408, the dequeued thread no longer in the queue 202 is allowed to speculatively execute in the critical section (block 416). Thus, when the thread corresponding to the head node 216a is dequeued the corresponding thread retries execution in the critical section. Control proceeds to block 410.

As described above, one or more of the threads 104 are speculatively executing in the critical section as control arrives at the example of FIG. 5. For example, one or more threads no longer in the queue 202 may be speculatively executing in the critical section and the thread corresponding to the head node 216a may be speculatively executing in the critical section. In the illustrated example, if a conflict occurs to a thread executing in the critical section that is not presently in the queue 202 (block 500), a new node is added to the queue 202 as the last node 216n of the queue 202 corresponding to the thread that experienced the conflict (block 502). In the illustrated example, if a conflict occurs to the thread of the head node 216a that is retrying execution in the critical section (block 504), the adjuster 205 decreases the current quota 210 and resets the thread count 212 to zero (0) (block 506). Additionally, in the illustrated example, the queue controller 204 dequeues the thread from the head node 216a and creates a corresponding new node as the last node 216n of the queue 202 for that thread (block 508). That is, the thread of the head node 216a moves itself to the end of the queue 202. Alternatively, the thread of the head node 216a can be dequeued immediately and start speculative execution. Notably, the decrease to the current quota 210 reflects the occurrence of the conflict and the adjustment that may be desirable to reduce the number of threads allowed to concurrently execute in the critical section.

In the illustrated example, if no conflict occurs to threads not in the queue 202 (block 500) and no conflict occurs to the thread of the head node 216a of the queue 202 (block 504), control proceeds to block 510. In the illustrated example of FIG. 5, if the thread of the head node 216a successfully executes (e.g., is fully committed without experiencing an aborted transaction) (block 510), control proceeds to FIG. 6. Otherwise, control proceeds to block 404 of FIG. 4.

In the illustrated example of FIG. 6, the adjuster 205 resets the thread count 212 to zero (0) (block 600). In the illustrated example, the thread of the head node 216a determines whether a reduction has occurred to the current quota 210 due to, for example, a conflict occurring before the thread of the head node 216a has successfully executed. In the illustrated example, if the current quota 210 is the same as the initial quota 208 (e.g., the current quota 210 has not been reduced since being set to equal the initial quota 208 at block 402 of FIG. 4) (block 602), the adjuster 205 increases (e.g., increments) the initial quota 208 (block 604). The increase of the initial quota 208 increases an aggressiveness of the AQL manager 112 by allowing more threads to concurrently speculatively execute in the critical section. In the illustrated example, if the current quota 210 is not the same as the initial quota 208 (block 602), the thread of the head node 216a determines whether the current quota 210 is less than the initial quota 208 by a threshold amount (e.g., one (1) or two (2)) (block 606). In the illustrated example, if the current quota 210 is less than the initial quota 208 by the threshold amount (block 606), the adjuster 205 decreases (e.g., decrements) the initial quota (block 608). The decrease of the initial quota 208 decreases the aggressiveness of the AQL manager 112 by allowing less threads to concurrently speculatively execute in the critical section, thereby increasing the likelihood that threads will successfully execute without experiencing a conflict. In the illustrated example, control returns to block 402 of FIG. 4. In the illustrated example of FIG. 6, if the current quota 210 is not less than the initial quota 208 by the threshold amount (block 606), control proceeds to block 402 of FIG. 4.

While the example flowchart of FIGS. 4-6 include the adjuster 205 performing adjustments to the initial quota 208, the current quota 210 and the thread count 212, these adjustments and/or any other suitable operation of the FIGS. 4-6 may be performed by the thread at the head of the queue 202. For example, the thread at the head of the queue 202 may provide instructions to the adjuster 205 to make the appropriate changes and/or the thread at the head of the queue 202 may directly make the adjustments to one or more of the variables associated the lock 200.

Figure 7:
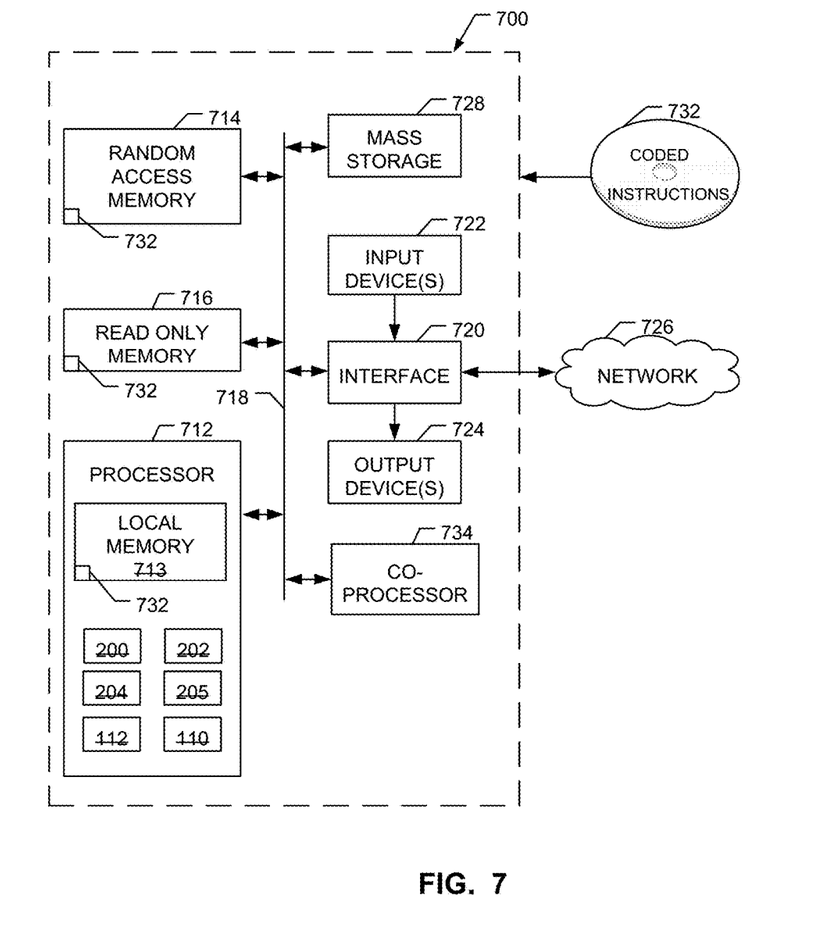
FIG. 7 is a block diagram of an example processing system capable of implementing the example AQL manager of FIGS. 1 and/or 2 by executing the example machine readable instructions of FIGS. 4-6.

FIG. 7 is a block diagram of an example processor platform 700 capable of executing the instructions of FIGS. 4-6 to implement the example AQL manager 112 of FIGS. 1 and/or 2. The processor platform 700 can be, for example, a server, a personal computer, a mobile device (e.g., a cell phone, a smart phone, a tablet, a wearable, etc.), a personal digital assistant (PDA), an Internet appliance, a media player (e.g., a DVD player, a CD player, a digital video recorder, a Blu-ray player, etc.), a gaming console, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. In some examples, the processor 712 implements the example conflict detector 110 of FIG. 1, the example AQL manager 112 of FIGS. 1 and/or 2, the example lock 200 of FIGS. 1 and/or 2, the example queue controller 204 of FIG. 2 and/or the example adjuster 205 of FIG. 2.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard disk drives, compact disk drives, Blu-ray disk drives, RAID systems, and digital versatile disk (DVD) drives.

Coded instructions 732 of FIGS. 4-6 may be stored in the mass storage device 728, in the volatile memory 714, in the non-volatile memory 716, and/or on a removable tangible computer readable storage medium such as a CD or DVD.

An example disclosed apparatus includes a lock to enforce a first quota to control a number of threads allowed to concurrently speculatively execute after being placed in a queue; and in response to the first quota not having been reached, enable a first thread from the queue to speculatively execute; and an adjuster to change a first value of the first quota based on a result of the speculative execution of the first thread, wherein at least one of the lock or the adjuster is implemented via a logic circuit.

In some disclosed examples, the adjuster is to change the first value of the first quota based on the result of the speculative execution of the first thread by decreasing the first quota when the result is an abort of the first thread.

In some disclosed examples, the adjuster is to change a second value of a second quota based on the result of the speculative execution of the first thread.

In some disclosed examples, the adjuster is to change the second value of the second quota based on the result of the speculative execution of the first thread by: increasing the second value when the result is a successful execution and the first value equals the second value; and decreasing the second value when the result is a successful execution and the first is less the second value by a threshold amount.

In some disclosed examples, the apparatus further includes a controller to, in response to the first quota not having been reached, dequeue the first thread in connection with the enabling of the first thread from the queue to speculatively execute.

In some disclosed examples, the controller is to, in response to the first quota having been reached, maintain the first thread at a head of the queue.

In some disclosed examples, the lock is to, in response to the first quota having been reached, enable the first thread to speculatively execute with the first thread maintained at the head of the queue.

An example disclosed method includes enforcing, via a processor, a first quota to control a number of threads allowed to concurrently speculatively execute after being placed in a queue; in response to the first quota not having been reached, enabling, via the processor, a first thread from the queue to speculatively execute; and changing, via the processor, a first value of the first quota based on a result of the speculative execution of the first thread.

In some disclosed examples, the changing of the first value of the first quota based on the result of the speculative execution of the first thread includes decreasing the first quota when the result is an abort of the first thread.

In some disclosed examples, the method further includes changing a second value of a second quota based on the result of the speculative execution of the first thread.

In some disclosed examples, the changing of the second value of the second quota based on the result of the speculative execution of the first thread includes: increasing the second value when the result is a successful execution and the first value equals the second value; and decreasing the second value when the result is a successful execution and the first is less the second value by a threshold amount.

In some disclosed examples, the method further includes, in response to the first quota not having been reached, removing the first thread from the queue in connection with the enabling of the first thread from the queue to speculatively execute.

In some disclosed examples, the method further includes, in response to the first quota having been reached, maintaining the first thread at a head of the queue.

In some disclosed examples, the method further includes, in response to the first quota having been reached, enabling the first thread to speculatively execute with the first thread maintained at the head of the queue.

A disclosed example includes at least one tangible computer readable storage medium comprises instructions that, when executed, cause machine to at least enforce a first quota to control a number of threads allowed to concurrently speculatively execute after being placed in a queue; in response to the first quota not having been reached, enable a first thread from the queue to speculatively execute; and change a first value of the first quota based on a result of the speculative execution of the first thread.

In some disclosed examples, the instructions, when executed, cause the machine to change the first value of the first quota based on the result of the speculative execution of the first thread by decreasing the first quota when the result is an abort of the first thread.

In some disclosed examples, the instructions, when executed, cause the machine to change a second value of a second quota based on the result of the speculative execution of the first thread.

In some disclosed examples, the instructions, when executed, cause the machine to change the second value of the second quota based on the result of the speculative execution of the first thread by: increasing the second value when the result is a successful execution and the first value equals the second value; and decreasing the second value when the result is a successful execution and the first is less the second value by a threshold amount.

In some disclosed examples, the instructions, when executed, cause the machine to, in response to the first quota not having been reached, remove the first thread from the queue in connection with the enabling of the first thread from the queue to speculatively execute.

In some disclosed examples, the instructions, when executed, cause the machine to, in response to the first quota having been reached, maintain the first thread at a head of the queue.

In some disclosed examples, the instructions, when executed, cause the machine to, in response to the first quota having been reached, enable the first thread to speculatively execute with the first thread maintained at the head of the queue.

An example disclosed adaptive queued locking (AQL) manager includes means for enforcing a first quota to control a number of threads allowed to concurrently speculatively execute after being placed in a queue; means for enabling a first thread from the queue to speculatively execute in response to the first quota not having been reached; and means for changing a first value of the first quota based on a result of the speculative execution of the first thread.

In some disclosed examples, the means changing the first value of the first quota based on the result of the speculative execution of the first thread is to decrease the first quota when the result is an abort of the first thread.

In some disclosed examples, the means for changing the first value is to change a second value of a second quota based on the result of the speculative execution of the first thread.

In some disclosed examples, the means for changing the first value is to change the second value of the second quota based on the result of the speculative execution of the first thread by: increasing the second value when the result is a successful execution and the first value equals the second value; and decreasing the second value when the result is a successful execution and the first is less the second value by a threshold amount.

In some disclosed examples, the adaptive queued locking manager further including means for removing the first thread from the queue in connection with the enabling of the first thread from the queue to speculatively execute, wherein the removing of the first thread from the queue is in response to the first quota not having been reached.

In some examples, the means for removing the first thread from the queue is to, in response to the first quota having been reached, maintain the first thread at a head of the queue.

In some examples, the means to enable the first thread from the queue to speculatively execute is to, in response to the first quota having been reached, enable the first thread to speculatively execute with the first thread maintained at the head of the queue.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
    a queue controller to control removal of threads from a queue, the queue to contain threads that are waiting to be permitted to speculatively execute in a critical section of a multi-threaded program;
    a first thread associated with a head node of the queue, the queue controller to control the removal of threads from the queue in response to operations performed by the first thread, and when a number of threads executing in the critical section reaches a quota, the first thread to retry speculatively executing in the critical section and to remain associated with the head node of the queue to prevent a second thread corresponding to a second node of the queue from retrying speculatively executing in the critical section; and
    an adjuster to change a number of threads permitted to speculatively execute based on a rate of threads currently speculatively executing transactions in the critical section, the adjuster is implemented via a logic circuit.

2. The apparatus of claim 1, wherein the quota is a current quota, and the first thread is to determine whether a number of threads executing in the critical section has reached the quota by comparing the current quota to a thread count, the current quota corresponding to a first number of threads permitted to speculatively execute in the critical section after being in the queue, and the thread count to correspond to a second number of threads currently speculatively executing in the critical section.

3. The apparatus of claim 2, wherein the first thread is to:
    in response to the current quota being less than the thread count, speculatively execute in the critical section after disassociating from the head node of the queue.

4. The apparatus of claim 2, wherein the adjuster is further to:
    when the current quota is less than the thread count during an iteration of the critical section, decrement an initial quota, the initial quota corresponding to a number of threads initially permitted to speculatively execute in the critical section after being in the queue; and
    before a next iteration of the critical section, set the current quota equal to the initial quota.

5. The apparatus of claim 2, wherein the adjuster is further to:
    in response to one of the threads experiencing a conflict during a first iteration of the critical section while speculatively executing in the critical section, decrement the current quota and set the thread count to zero before a second iteration of the critical section is started.

6. The apparatus of claim 5, wherein the queue controller is to add a thread that was speculatively executing, but not in the queue at the time of the conflict, to the end of the queue before the second iteration of the critical section begins.

7. The apparatus of claim 1, wherein the quota is a number of threads permitted to speculatively execute after being in the queue and the adjuster is to change the quota by decreasing the quota in response to an abort of the first thread.

8. A method, comprising:
    comparing, by executing an instruction with at least one processor, a current quota to a thread count, the thread count corresponding to a first number of threads currently speculatively executing in a critical section of a multi-threaded program, the current quota corresponding to a second number of threads permitted to speculatively execute in the critical section after being in a queue, the queue identifying threads that are waiting to be permitted to speculatively execute in the critical section;
    based on the comparison of the current quota to the thread count, controlling, by executing an instruction with the at least one processor, removal of threads from the queue, the threads removed from the queue to retry speculative execution in the critical section;
    increasing, by executing an instruction with the at least one processor, the current quota as a rate at which threads are successfully executing in the critical section increases; and
    decreasing, by executing an instruction with the at least one processor, the current quota as the rate at which threads are successfully executing in the critical section decreases.

9. The method of claim 8, further including:
    associating respective threads identified in the queue with respective ones of a set of nodes, including associating a first thread in the queue associated with a head node;
    when the current quota is equal to the thread count:
        causing the first thread to begin speculatively executing in the critical section; and
        continuing to associate the first thread with the head node while the first thread is speculatively executing in the critical section, the association between the first thread and the head node to prevent other threads in the queue from speculatively executing in the critical section.

10. The method of claim of claim 9, further including, when one of the threads speculatively executing in the critical section experiences a conflict during a first iteration of the critical section, decrementing the current quota and setting the thread count to zero before a second iteration of the critical section is started.

11. The method of claim 10, further including:
adding, to the end of the queue, any threads that were speculatively executing when the conflict occurred, and that were not in the queue at the time of the conflict, before the second iteration begins.

12. The method of claim 9, further including:
when the current quota is less than the thread count, disassociating the first thread from the head node; and
causing, after the first thread has been disassociated from the head node, the first thread to begin speculatively executing in the critical section.

13. The method of claim 9, further including:
when the current quota is less than the thread count during an iteration of the critical section:
decrementing an initial quota corresponding to a second number of threads initially permitted to speculatively execute in the critical section after being in the queue; and
before a next iteration of the critical section, setting the current quota equal to the initial quota.

14. At least one tangible computer readable storage medium comprising instructions that, when executed, cause at least one machine to at least:
populate a queue with a list of threads that experienced a memory access conflict while executing in a critical section of a multi-threaded program;
associate respective threads in the queue with respective ones of a set of nodes, the first thread in the queue being associated with a head node of the set of nodes;
compare a current quota to a thread count, the thread count corresponding to a first number of threads currently speculatively executing in a critical section of a multi-threaded program, the current quota corresponding to a second number of threads permitted to speculatively execute in the critical section after being in the queue;
when the current quota is greater than the thread count, disassociate the first thread from the queue and permit the first thread to retry speculative execution in the critical section; and
when the current quota is equal to the thread count, permit the first thread to retry speculative execution in the critical section while maintaining the association between the first thread and the head node to prevent other threads in the queue from retrying speculative execution in the critical section.

15. The at least one storage medium of claim 14, wherein the instructions further to cause the at least one machine to adjust the current quota by, when one of the threads speculatively executing in the critical section experiences a conflict during a first iteration of the critical section, decrementing the current quota, and setting the thread count to zero before a second iteration of the critical section is started.

16. The at least one storage medium of claim 15, wherein the instructions further to cause the at least one machine to:
add, to the end of the queue, any threads that were speculatively executing when the conflict occurred and that were not in the queue at the time of the conflict, before a second iteration of the critical section.

* * * * *